US008873552B2

(12) United States Patent
Bhagavathiperumal et al.

(10) Patent No.: US 8,873,552 B2
(45) Date of Patent: Oct. 28, 2014

(54) UNREGISTERED MULTICAST (MC) PACKET FORWARDING TO MULTICAST ROUTER PORTS

(75) Inventors: Chidambaram Bhagavathiperumal, Santa Clara, CA (US); Minh V. Mac, San Jose, CA (US); Anitha T. Venkatraman, Chantilly, VA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/424,187

(22) Filed: Mar. 19, 2012

(65) Prior Publication Data

US 2013/0242989 A1    Sep. 19, 2013

(51) Int. Cl.
*H04L 12/46*    (2006.01)
(52) U.S. Cl.
CPC .................................. *H04L 12/4641* (2013.01)
USPC ......................................................... 370/390
(58) Field of Classification Search
CPC ........................... H04L 12/46; H04L 12/4641
USPC ......................................................... 370/390
See application file for complete search history.

(56) References Cited

U.S. PATENT DOCUMENTS

| 6,023,563 | A | 2/2000 | Shani |
| 7,099,317 | B2 | 8/2006 | Ambe et al. |
| 7,333,488 | B2 * | 2/2008 | Sumiyoshi .................... 370/390 |
| 7,684,403 | B2 | 3/2010 | Kim et al. |
| 7,796,594 | B2 | 9/2010 | Melman et al. |
| 7,953,086 | B2 * | 5/2011 | Chuang et al. ................ 370/390 |
| 7,962,037 | B2 | 6/2011 | Mizutani et al. |
| 8,208,418 | B1 * | 6/2012 | Grosser et al. ............... 370/312 |
| 8,611,270 | B1 * | 12/2013 | Sapkota et al. .............. 370/312 |
| 2010/0020796 | A1 | 1/2010 | Park et al. |
| 2010/0040060 | A1 * | 2/2010 | Gleeson ........................ 370/392 |
| 2010/0135297 | A1 * | 6/2010 | Brousard et al. ............. 370/390 |
| 2011/0134925 | A1 * | 6/2011 | Safrai et al. ............. 370/395.53 |
| 2013/0136122 | A1 * | 5/2013 | Keesara et al. .............. 370/390 |
| 2013/0182706 | A1 * | 7/2013 | Angst et al. .................. 370/390 |
| 2013/0182707 | A1 * | 7/2013 | Angst et al. .................. 370/390 |

FOREIGN PATENT DOCUMENTS

| JP | 2008-060631 | 3/2008 |
| JP | 2010-109574 | 5/2010 |

* cited by examiner

*Primary Examiner* — Paul H Masur
(74) *Attorney, Agent, or Firm* — Zilka-Kotab, PC

(57) ABSTRACT

In one embodiment, a system includes a switching processor, logic configured for installing a Multicast Control (MC) table on a switching processor managing switching on a virtual local area network, logic configured for determining if multicast flooding is disabled in the switching processor, logic configured for installing a drop entry in the MC table upon determining that multicast flooding is disabled in the switching processor, logic configured for detecting whether one or more multicast routers is connected to one or more ports coupled to the switching processor, logic configured for receiving at least one multicast packet, and logic configured for dropping the at least one multicast packet based on the drop entry when no multicast router is connected to any of the one or more ports coupled to the switching processor. Other systems, methods, and computer program products are presented in accordance with more embodiments.

20 Claims, 6 Drawing Sheets

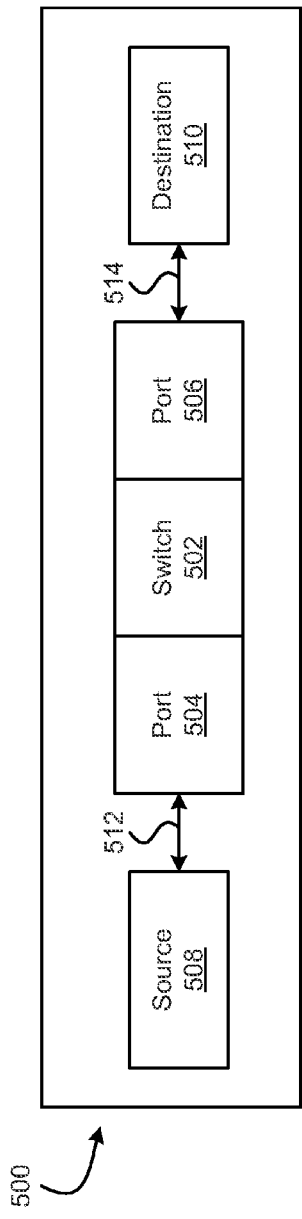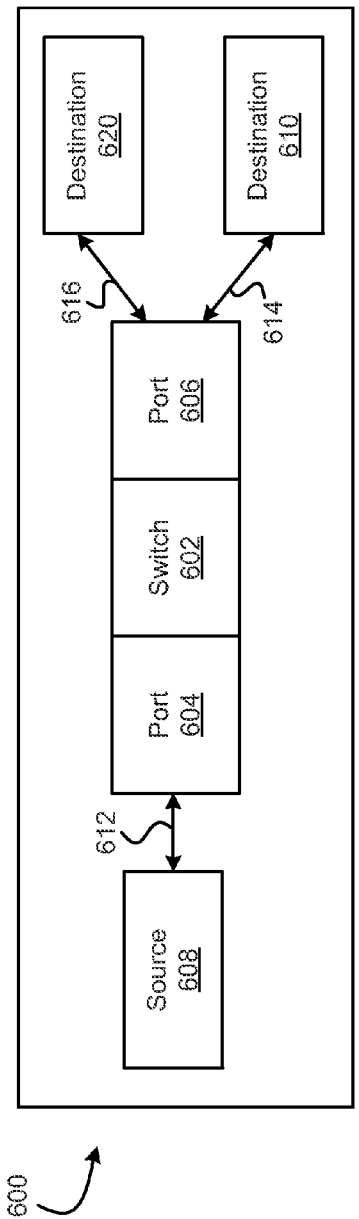

UNREGISTERED MULTICAST (MC) PACKET FORWARDING TO MULTICAST ROUTER PORTS

BACKGROUND

The present invention relates to data center infrastructure, and more particularly, this invention relates to Ethernet switches capable of unregistered Multicast Control (MC) packet switching.

In packet-switched network switches, look-up is typically performed on a destination media access control (MAC) address or a destination Internet protocol (IP) address to discover an actual destination port for forwarding the packet. Most systems utilize a switching processor of some kind, such as an application specific integrated circuit (ASIC). In operation, the conventional switching processor forwards unregistered IP multicast data packets to a multicast router port. The multicast router port is typically acquired via an Internet Group Multicast Protocol (IGMP) query, protocol independent multicast (PIM) hello message(s), or is preconfigured on a virtual local area network (VLAN) when multicast flooding is disabled in the switch.

Unfortunately, conventional MC switching protocols such as Internet Protocol Multicast Communications (IPMC) switching protocols suffer from two primary disadvantages. First, unregistered multicast data traffic is trapped continuously to a central processing unit (CPU) until multicast router ports are learned or programmed in the hardware. This keeps the CPU busy processing packets, disadvantageously consuming network and system resources.

A second disadvantage of the conventional IPMC switching protocols is that separate entries must be added for each multicast group for which data traffic is received on a particular VLAN.

SUMMARY

In one embodiment, a system includes a switching processor, logic configured for installing a Multicast Control (MC) table on a switching processor managing switching on a virtual local area network, logic configured for determining if multicast flooding is disabled in the switching processor, logic configured for installing a drop entry in the MC table upon determining that multicast flooding is disabled in the switching processor, logic configured for detecting whether one or more multicast routers is connected to one or more ports coupled to the switching processor, logic configured for receiving at least one multicast packet, and logic configured for dropping the at least one multicast packet based on the drop entry when no multicast router is connected to any of the one or more ports coupled to the switching processor.

In another embodiment, a method includes installing a MC table on a switching processor, wherein the switching processor manages switching on at least one virtual local area network, determining that multicast flooding is enabled or disabled in the switching processor, installing a drop entry in the MC table upon determining that multicast flooding is disabled in the switching processor, detecting whether any multicast routers that are connected to one or more ports coupled to the switching processor, receiving at least one multicast packet, and dropping the at least one multicast packet based on the drop entry when no multicast router is connected to any of the one or more ports coupled to the switching processor.

In another embodiment, a computer program product for controlling multicast switching on a switching processor includes computer readable program code, the computer readable program code including computer readable program code configured for installing an MC table on a switching processor managing switching on at least one virtual local area network, computer readable program code configured for determining that multicast flooding is enabled or disabled in the switching processor, computer readable program code configured for installing a drop entry in the MC table upon determining that multicast flooding is disabled in the switching processor, computer readable program code configured for detecting any multicast routers that are connected to one or more ports coupled to the switching processor, computer readable program code configured for installing a multicast router flood entry in the MC table when at least one multicast router is connected to any of the one or more ports on the switching processor, computer readable program code configured for receiving at least one multicast packet, computer readable program code configured for dropping the at least one multicast packet based on the drop entry when no multicast router is connected to any of the one or more ports coupled to the switching processor, computer readable program code configured for determining at least one destination based on the multicast router flood entry when at least one multicast router is connected any of the one or more ports on the switching processor, and computer readable program code configured for sending the at least one multicast packet to the at least one destination.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 5 shows one configuration for multicast packet switching in a network environment, according to one embodiment.

FIG. 6 shows another configuration for multicast packet switching in a network environment, according to one embodiment.

DETAILED DESCRIPTION

Figure 1:
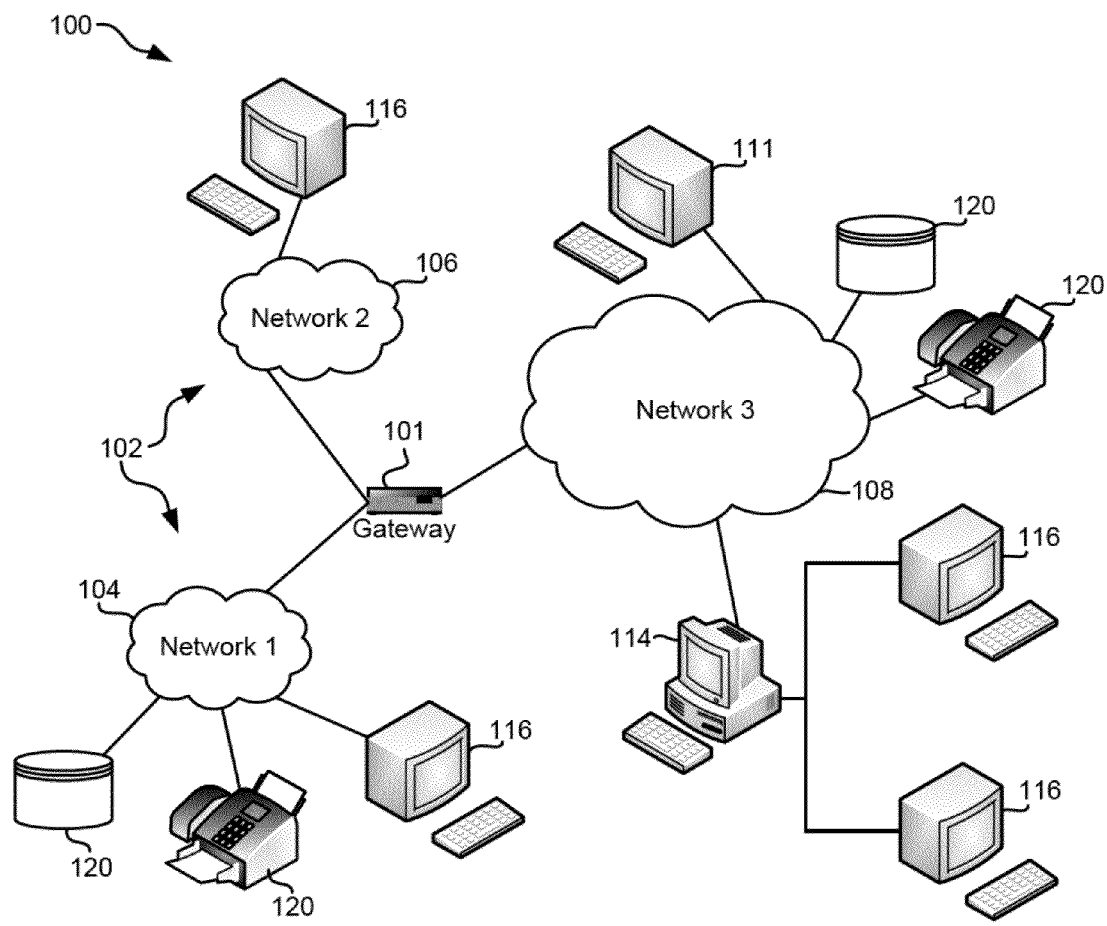
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In general, it would be beneficial to provide a system and protocol for forwarding unregistered Multicast Control (MC) packets to multicast router ports using only a single multicast flood entry and without requiring that data traffic be trapped to a central processor. Various embodiments provide such features.

Advantages of the presently described multicast packet forwarding systems and methods can be described as follows. Conventional configurations processing multicast packets across a switch connected to multiple virtual local area networks (VLANs) require that separate entries for each packet and each VLAN be dynamically created upon receipt, and further require that such packets be retained in the switching processor whenever multicast flooding is disabled. As discussed above, both of these requirements are undesirable and consume network resources unnecessarily.

In sharp contrast, some of the inventive systems and methods described herein require only a single entry to be created upon detecting a multicast router on a particular VLAN connected to one or more ports coupled to the switch and/or switching processor, in various approaches. In other words, some of the presently described systems and/or methods only require that each unique VLAN with an associated multicast router connected to one or more ports coupled to the switching processor have a unique entry in the MC table, vastly reducing the number of entries required in comparison to the conventional multicast forwarding methods and systems. Moreover still, packets need not be retained in the switching processor while multicast flooding is disabled, and are preferably dropped according to the drop entry as described below.

While much of the present description refers to Internet protocol Multicast Communications (IPMC) tables, this has been done solely to assist the reader and to place the description in a context. It should be understood that any embodiments described herein may be directed to protocols other than internet protocol (IP) and the IPMC table thus described may be, more generally, a MC table.

In one general embodiment, a system includes a switching processor, logic configured for installing a MC table on a switching processor managing switching on a VLAN, logic configured for determining if multicast flooding is disabled in the switching processor, logic configured for installing a drop entry in the MC table upon determining that multicast flooding is disabled in the switching processor, logic configured for detecting whether one or more multicast routers is connected to one or more ports coupled to the switching processor, logic configured for receiving at least one multicast packet, and logic configured for dropping the at least one multicast packet based on the drop entry when no multicast router is connected to any of the one or more ports coupled to the switching processor.

In another general embodiment, a method includes installing a Multicast Control table on a switching processor, wherein the switching processor manages switching on at least one VLAN, determining that multicast flooding is enabled or disabled in the switching processor, installing a drop entry in the MC table upon determining that multicast flooding is disabled in the switching processor, detecting whether any multicast routers that are connected to one or more ports coupled to the switching processor, receiving at least one multicast packet, and dropping the at least one multicast packet based on the drop entry when no multicast router is connected to any of the one or more ports coupled to the switching processor.

In another general embodiment, a computer program product for controlling multicast switching on a switching processor includes computer readable program code, the computer readable program code including computer readable program code configured for installing a MC table on a switching processor managing switching on at least one VLAN, computer readable program code configured for determining that multicast flooding is enabled or disabled in the switching processor, computer readable program code configured for installing a drop entry in the MC table upon determining that multicast flooding is disabled in the switching processor, computer readable program code configured for detecting any multicast routers that are connected to one or more ports coupled to the switching processor, computer readable program code configured for installing a multicast router flood entry in the MC table when at least one multicast router is connected to any of the one or more ports on the switching processor, computer readable program code configured for receiving at least one multicast packet, computer readable program code configured for dropping the at least one multicast packet based on the drop entry when no multicast router is connected to any of the one or more ports coupled to the switching processor, computer readable program code configured for determining at least one destination based on the multicast router flood entry when at least one multicast router is connected any of the one or more ports on the switching processor, and computer readable program code configured for sending the at least one multicast packet to the at least one destination.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
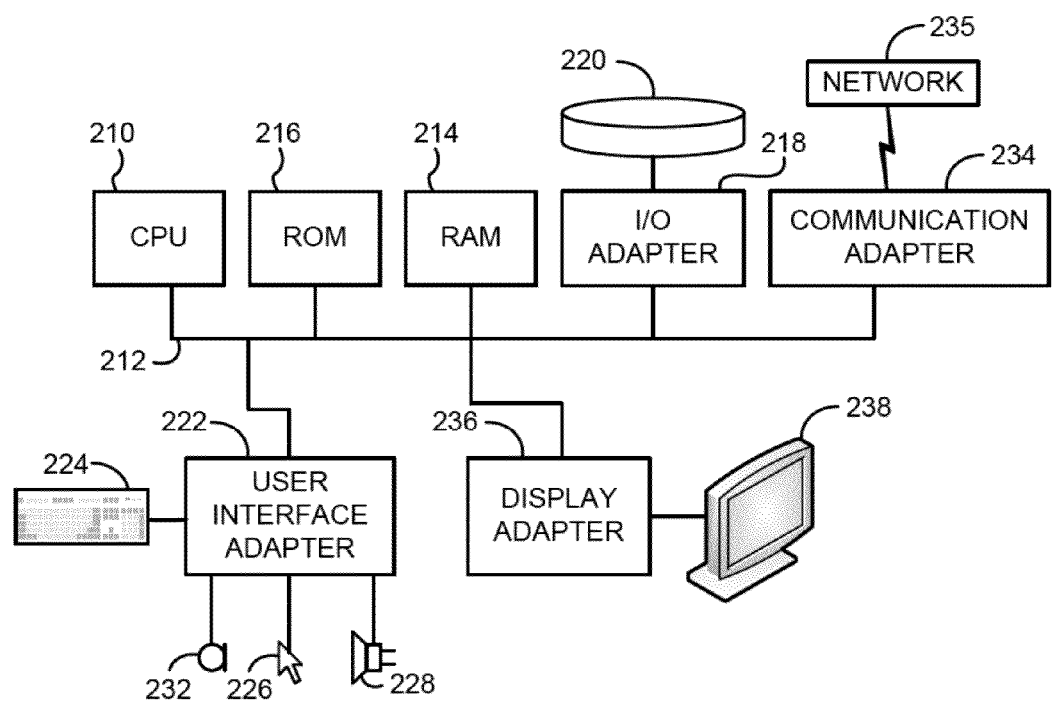
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML; C, and/or C++ language, or other programming languages, along with an object oriented programming methodology. Object oriented programming (OOP), which has become increasingly used to develop complex applications, may be used.

Several exemplary embodiments and applications of the presently described systems and methods will now be described with reference to the figures.

Figure 3:
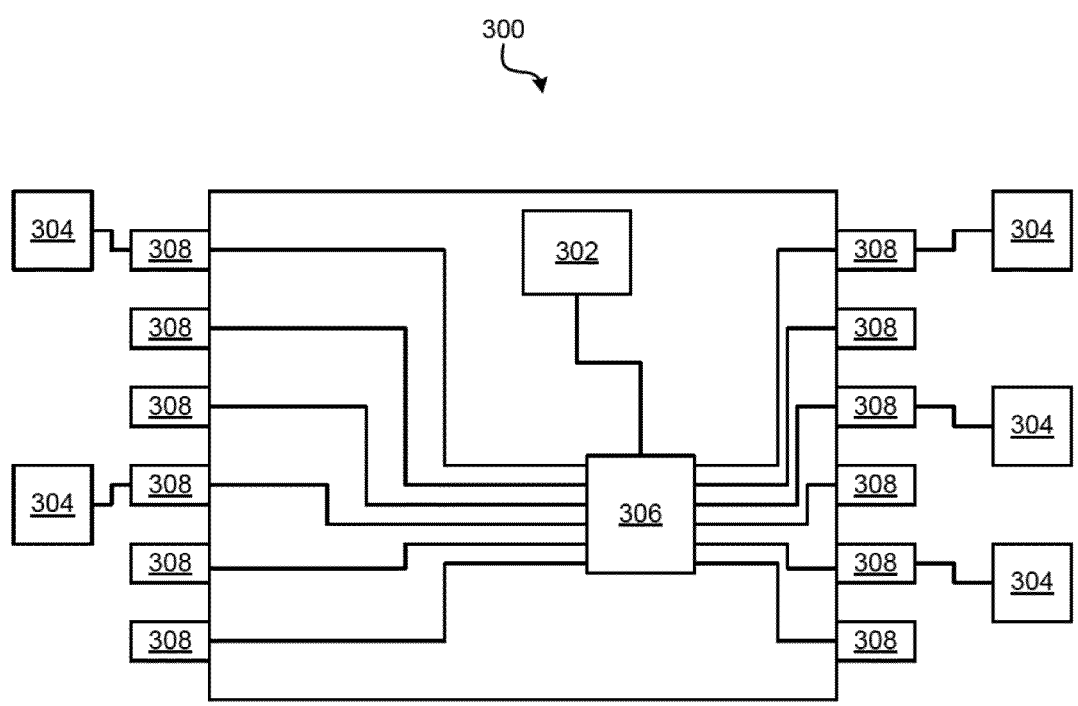
FIG. 3 is a simplified diagram of a switching device, according to one embodiment.

Referring now to FIG. 3, a switching device 300 is shown according to one embodiment. As shown, the switching system 300 comprises a server 302, such as a dynamic host configuration protocol (DHCP) server, adapted for assigning and managing device addresses for devices 304 electrically connected to the switching system 300. The server 302 is electrically coupled to a switching processor 306 for executing logic. Any type of processor known in the art may be used for the server 302 and/or the switching processor 306, such as a central processing unit (CPU), a field programmable gate array (FPGA), an integrated circuit (IC), an application specific integrated circuit (ASIC), etc. The device addresses (which may also be referred to as destination addresses herein) may comprise media access control (MAC) addresses, IP addresses, and/or any other type of device address known in the art.

Figure 4:
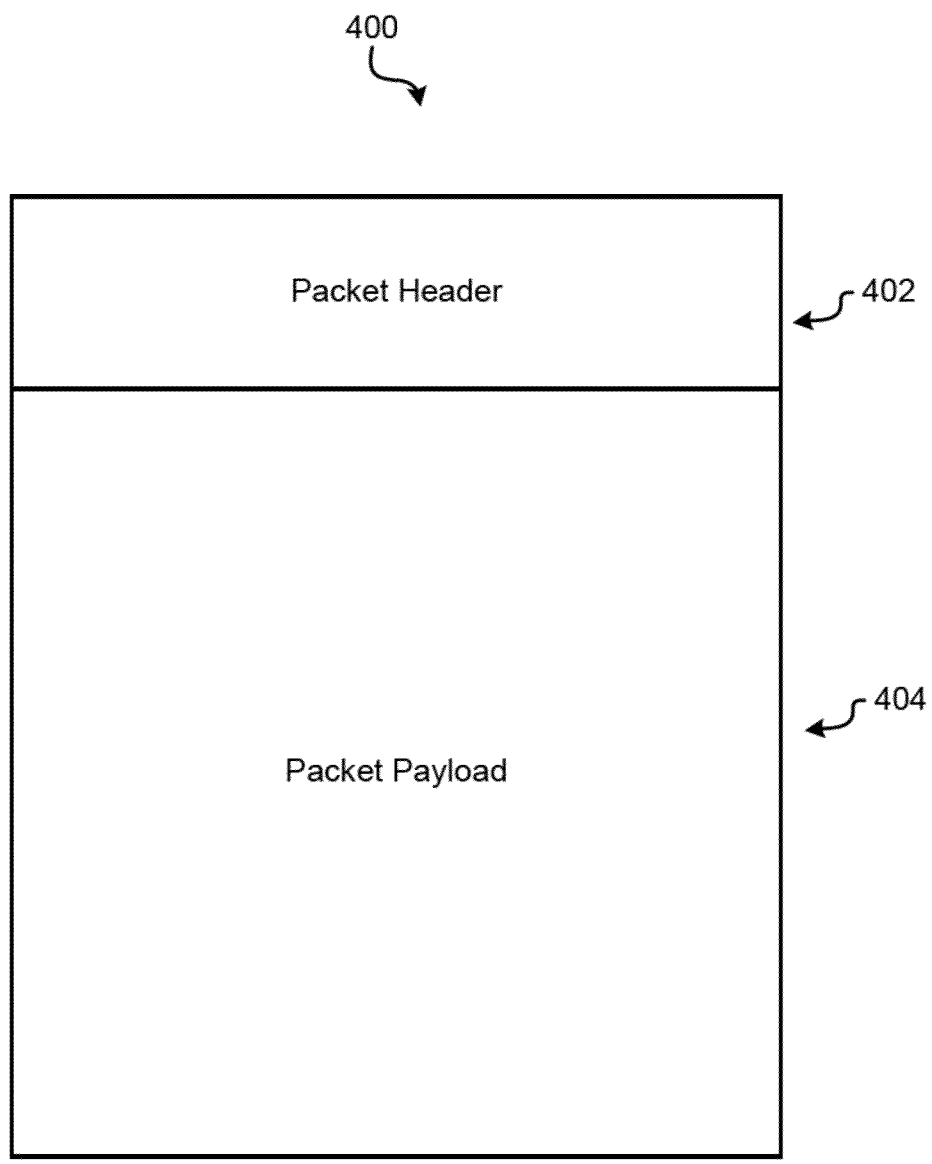
FIG. 4 is a simplified diagram of a packet, according to another embodiment.

In one embodiment, particularly as shown in FIG. 4, each packet 400 comprises a header 402 and a payload 404. Referring now to FIGS. 3-4, the switching processor 306 includes or has access to logic configured for installing an IPMC table on the switching processor 306. In some approaches, the IPMC table may be installed, for example, to an ASIC of the switching processor. In a preferred approach, the IPMC table is installed as a single entry in the ASIC of the switching processor 306.

Moreover, in additional embodiments the switching processor 306 includes or has access to logic configured for determining if multicast flooding is disabled in the switching processor 306.

Moreover still, the switching processor 306 further includes or has access to logic configured for installing a drop entry in the IPMC table upon determining that multicast flooding is disabled in the switching processor 306, in one approach. The drop entry may take many forms, and includes a group address and a mask, in one embodiment. In many embodiments, the drop entry group address is configured such that one or more multicast packets in an exemplary network environment belong to the group corresponding to the drop entry group address. In one particular embodiment, the drop entry group address is 224.0.0.0 and the drop entry mask is a 4-bit mask. However, any address and/or mask length may be used.

Furthermore, the switching processor 306 includes or has access to logic configured for detecting one or more multicast routers connected to one or more ports coupled to the switching processor. As will be understood by one having ordinary skill in the art upon reading the present descriptions, any detection method may be utilized to determine any multicast router (e.g., destination 308, 510, 610 and/or 620 of FIGS. 3, 5 and 6, respectively) connected to one or more ports coupled to the switching processor 306 (e.g., ports 504, 506, 604, and/or 606 as shown in FIGS. 5 and 6, respectively, and described in greater detail below), in various approaches.

In additional embodiments, the switching processor 306 includes or has access to logic configured for receiving at least one multicast packet (e.g. packet 400 as shown in FIG. 4). In one particular embodiment, the at least one multicast packet may be received by a packet switching ASIC of a packet switching device. Of course, the at least one multicast packet may also be received in any location and in any manner suitable for the presently described networking environment, as would be understood by one having ordinary skill in the art upon reading the present descriptions.

In still more embodiments, the switching processor 306 includes or has access to logic configured for dropping each multicast packet upon detecting that no multicast router is connected to any port coupled to the switching processor. In one approach, the logic configured for dropping the at least one multicast packet includes logic for sending the at least one multicast packet to the drop entry group address when the at least one multicast packet belongs to a group corresponding to the group address.

In still more embodiments, the switching processor 306 includes or has access to logic configured for installing a multicast router flood entry in the IPMC table upon detecting that at least one multicast router is connected to one or more ports on the switching processor. While the multicast router flood entry may take many forms, the multicast router flood entry includes a multicast router group address, a mask, and a VLAN identification (VLAN ID), according to one embodiment. As with the drop entry, the multicast router flood entry may be installed to an application-specific integrated circuit of the switching processor 306 in some approaches, but of course may be installed to any location and in any suitable manner as would be understood by one having ordinary skill in the art upon reading the present descriptions.

In one particular embodiment, the multicast router group address includes all addresses ranging from about 224.0.0.0 to about 239.255.255.255, and the multicast router flood entry mask is a 4-bit mask.

In some embodiments, the switching processor 306 includes or has access to logic configured for determining at least one destination based on the multicast router flood entry. In a preferable approach, the logic configured for determining at least one destination based on the multicast router flood entry includes logic configured for determining the at least one destination based on the VLAN ID in the multicast router flood entry.

In some approaches, the VLAN ID includes at least one destination address and at least one destination port. Moreover, the logic configured for determining at least one destination based on the multicast router flood entry, and/or the logic configured for determining at least one destination based on the VLAN ID includes logic configured for determining the at least one destination based on the at least one destination address and the at least one destination port. Further still, the logic configured for determining at least one destination based on the multicast router flood entry may include logic configured for performing a longest prefix match in the IPMC table, according to a preferred embodiment.

Alternatively and/or additionally, the switching processor 306 includes or has access to logic configured for determining the at least one destination based at least in part on at least one Internet Group Multicast Protocol (IGMP) report, in various embodiments.

According to various embodiments, the destination address may comprise a device address, a MAC address an IP address, or any other address capable of identifying a component of a network environment, as would be understood by one having ordinary skill in the art upon reading the present descriptions.

In additional embodiments, the switching processor 306 includes or has access to logic configured for sending the at least one multicast packet (e.g. packet 400 as shown in FIG. 4, according to one embodiment) to the at least one destination (e.g. destination 308, 510, 610 and/or 620 of FIGS. 3, 5 and 6, respectively). As will be understood by one having ordinary skill in the art upon reading the present descriptions, the at least one multicast packet may be sent in any suitable manner, such as protocol-independent multicast (PIM) sparse mode (PIM-SM), PIM dense mode (PIM-DM), bidirectional PIM, PIM source-specific multicast (PIM-SSM), etc. as would be understood by one having ordinary skill in the art upon reading the present descriptions. Furthermore, the sending method may vary depending on the capabilities and configuration of the particular networking environment through which the packet is travelling, in various approaches.

Typically, in conventional switching devices, upon receiving a multicast packet, the packet is retained in a processor, for example a CPU, and a corresponding entry is dynamically created or installed in the processor. When multicast flooding is enabled, the packets are automatically flooded to all connected recipients. When multicast flooding is disabled, however, these entries are created and installed dynamically upon receipt of each packet and must be retained along with the packet in the processor. This retention may consume significant network resources, and dynamically creating entries for each multicast packet received while multicast flooding is disabled consumes further network resources and introduces unnecessary and cumbersome activity for the processor.

In some embodiments, more than one destination port 308 may be specified, such as one of a group of destination ports 308 in a link aggregation group, in one example. In these embodiments, other logic (described below) may be used to determine which destination port 308 to send the at least one packet 400, based on any number of factors or criteria, such as usage, processing speeds, traffic patterns, etc.

Link Aggregation (LAG)

In an Ethernet network, link aggregation (LAG) may be deployed as a solution for higher bandwidth applications and link/port redundancy. As defined in the IEEE 802.1AX standard, LAG provides a logical interface to the Media Access Control (MAC) client (higher layer protocol in network stack) and is responsible for distribution of frames across physical ports within a LAG enabled system with the help of a frame distribution algorithm.

While link aggregation improves throughput/resiliency performance of a network, higher layer protocols in the end host network stack may impose certain constraints on packet delivery. For TCP/IP networks, for example, one requirement may be in-order packet delivery.

A converged Ethernet network may include both Ethernet and storage-based communications. For example, storage communications may include Fiber Channel over Ethernet (FCoE) and/or RDMA over Converged Enhanced Ethernet (RoCEE). Various embodiments disclosed herein enable LAG for a converged network. In one approach, a server CNA (Converged Network Adapter) may be provided.

In various approaches, the inventive multicast packet switching systems and methods may also employ link aggregation in a network environment, as discussed with particular reference to FCoE and RoCEE. As would be understood by one having ordinary skill in the art upon reading the present descriptions, any type of link aggregation may be employed, according to several embodiments.

FCoE Over LAG

For storage networking, a server side storage protocol stack may or may not use an Ethernet LAG distribution policy. Where the storage protocol does not use an Ethernet LAG distribution policy, higher layer storage networking protocols at an end host may monitor physical link status and provide failover and/or load distribution from the storage-networking stack itself. On another end of the LAG link, namely the access switch, all individual physical ports may be treated as an independent layer 2 interface rather than as a part of a LAG, for purposes of FCoE traffic. This manifests into two constraints according to one preferred embodiment:

1) If the end host sends a storage request out of a physical port on a LAG enabled system, the response should preferably be returned to the same port on the LAG enabled system, according to one embodiment.
2) Certain broadcast (BCAST) or multicast (MCAST) packets for FCoE virtual LAN (VLAN) discovery and FCF (Fiber Channel Forwarder) discovery are preferably received by all ports within the LAG enabled system, in another embodiment.

Advantageously, in embodiments satisfying the above constrains, the functionality of LAG as defined in 802.1AX is not required for FCoE traffic on server facing ports of an access switch.

RoCEE Over LAG

Similar constraints as stated above regarding FCoE traffic in paragraph [0057] may also be imposed for RoCEE traffic, in one embodiment. According to such an embodiment, the requirement is that bi-directional TCP flow should be pinned to a physical port for the purpose of offload.

Converged Network with LAG

To support above requirements from the perspective of a switch, implemented in software, hardware or both, one embodiment provides the ability to define LAG parameters based on a specific VLAN, in another embodiment. FCoE/RoCEE traffic may be provided on a separate VLAN, and server-facing ports on the access switch may be treated as individual ports for the FCoE/RoCEE VLAN, but the same ports may be treated as part of LAG for a TCP/IP VLAN. Advantageously, this approach enables LAG for converged network.

For various embodiments, a switching device having, e.g., a circuit, an ASIC, processor executing software or firmware, etc. and ports preferably provide the following capabilities: 1) an ability to learn MAC on individual physical ports for a specific VLAN; and 2) an ability to replicate BCAST/MCAST on all ports of LAG on specific VLAN.

In another embodiment, system architecture may include the following features. For every individual physical port there may be a MAC layer associated therewith, and furthermore there may be a MAC line protocol that is running on top of the MAC layer. In one such embodiment of systems using layer two protocols, service requests are requested from the MAC line.

Moreover, when a LAG is created, a layer may be placed in-between the port and the MAC client, according to various embodiments. For example, in one embodiment the LAG may provide a MAC line, and then when a layer two request for a service is received, for example a request for sending a frame, the LAG module may handle the frame, and may employ a distribution algorithm in the LAG module which is configured for deciding where to send the packet, regardless of whether it was received on a first port or a second port.

As noted above, however, it is desirable to allow the storage protocols to access the individual ports, rather than being handled by a LAG module.

Now, with reference to one hypothetical converged network environment employing link aggregation via a LAG module, in a server, there may be a converged network adapter (CAN), and the CNA may have several ports, including a first port (P1) and a second port 2 (P2), in one embodiment. In some approaches, each of these ports may include at least two functions. One of the functions may be fiber channel communications and another function may be Ethernet communications, in some approaches.

One advantage of the above described link aggregation is that an Ethernet driver can tie up two ports to create a single interface. Thus, according to the hypothetical converged network environment described above, if P1 and P2 are each a 10 Gb port, the operating system may see the LAG interface as 20 Gb interface. Moreover, if a TCPI request is sent out over P1, and the reply is returned to P2, the LAG configuration may accept the reply.

For other types of standards-compliant communications such as fiber channel, RDMA, etc. (e.g., FCoE or RoCEE), however, LAG may not be usable in some approaches. In another hypothetical example, when a file system wants to access storage, the system may send a request to the first port P1.

Any known method of denoting packets as being from a particular VLAN, such as adding information to the header denoting the VLAN, may be used. In another approach, a tag in the packet or something that the switch will recognize may denote the VLAN.

In one approach, particularly reflected in FIG. 5, a VLAN environment 500 may include a switch 502 with a plurality of ports, e.g. a first port 504, and a second port 506 as shown in FIG. 5. In various approaches, the switch 502 includes a switching processor, such as switching processor 306. Moreover, a source 508 may be connected to the first port 504 via a first VLAN connection 512, and a destination 510 may be connected to the second port 506 via a second VLAN connection 514. In some embodiments, the destination 510 may comprise a router, and particularly a multicast router in preferred embodiments.

In another approach, exemplified in FIG. 6, a VLAN network environment 600 may include a switch 602 with a plurality of ports, e.g. a first port 604, a second port 606. Furthermore, a source 608 may also be connected to the first port 504 via a first VLAN connection 612; a first destination 610 may be connected to the second port 606 of the switch 602 via a second VLAN connection 614; and a second destination 620 may be connected to the second port 606 of the switch 602 via a third VLAN connection 616. Thus, ports 504, 506, 604 and 606 are capable of supporting multiple connections or only a single connection, in various approaches.

In still another approach conforming with the embodiment exemplified in FIG. 6, the first destination 610 and second destination 620 may reside on separate VLANs such that the switch 602 is capable of managing packet switching across multiple VLANs. As will be understood by one having ordinary skill in the art upon reading the present descriptions, while FIG. 6 depicts two destinations 610, 620, which may reside on different VLANs, the inventive systems described herein may encompass any number of destinations, limited only by the number of VLANs and routers supported in a given network environment.

Advantages of the presently described multicast packet forwarding systems and methods can be described as follows. Conventional configurations processing multicast packets across a switch (e.g., switch 602) connected to multiple VLANs require that separate entries for each packet and each VLAN be dynamically created upon receipt, and further require that such packets be retained in the switching processor 306 whenever multicast flooding is disabled. As discussed above, both of these requirements are undesirable and consume network resources unnecessarily.

In sharp contrast, some of the inventive systems and methods described herein require only a single entry to be created upon detecting a multicast router on a particular VLAN connected to one or more ports coupled to the switch 502, 602 and/or switching processor 306, in various approaches. In other words, some of the presently described systems and/or methods only require that each unique VLAN with an associated multicast router connected to one or more ports coupled to the switching processor 306 have a unique entry in the IPMC table, vastly reducing the number of entries required in comparison to the conventional multicast forwarding methods and systems. Moreover still, packets need not be retained in the switching processor 306 while multicast flooding is disabled, and are preferably dropped according to the drop entry as described above.

Figure 7:
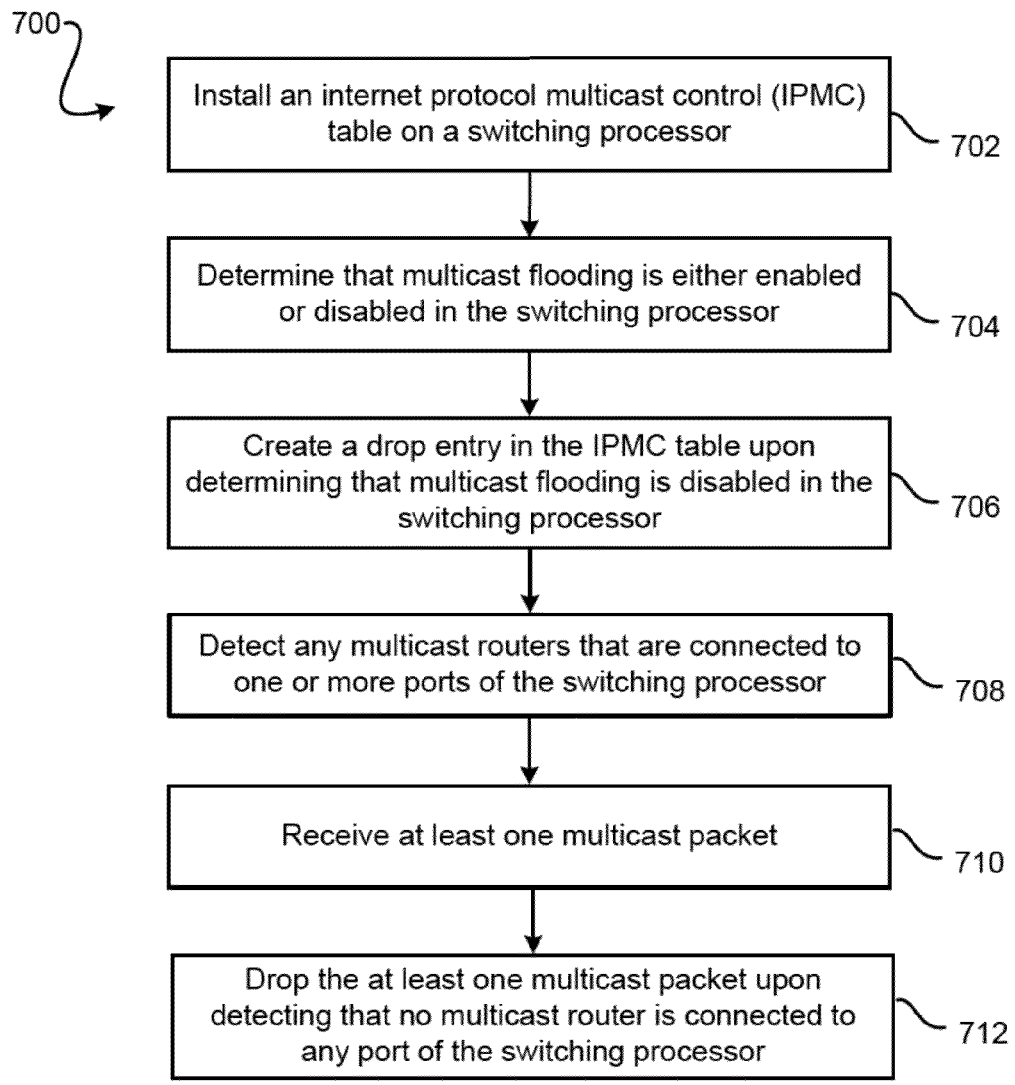
FIG. 7 is a flowchart of a method, according to another embodiment.

Now referring to FIG. 7, a flowchart of a method 700 is shown, according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a switching device and/or a DHCP server of a switching device, as would be understood by one having ordinary skill in the art upon reading the present descriptions.

In one embodiment, the method 700 includes operation 702, where an IPMC table is installed on a switching processor. Notably, the switching processor may manage switching on a VLAN in some approaches. Moreover, in additional approaches the IPMC table may be installed as a single entry in an ASIC of the switching processor, e.g. switching processor 306.

In another embodiment, the method 700 includes operation 704, where it is determined that multicast flooding is either enabled or disabled in the switching processor.

In still another embodiment, the method 700 includes operation 706, where a drop entry is created in the IPMC table upon determining that multicast flooding is disabled in the switching processor. As described similarly above, the drop entry may include a group address and a mask, in one embodiment. In one particular embodiment, the group address may be 224.0.0.0 and the mask may be a 4-bit mask.

In still yet another embodiment, the method 700 includes operation 708, where one or more multicast routers that are connected to one or more ports coupled to the switching processor are detected.

In one embodiment, the method 700 includes operation 710, where at least one multicast packet is received.

In another embodiment, the method 700 includes operation 712, where the at least one multicast packet is dropped upon detecting that no multicast router is connected to any port coupled to the switching processor.

In more approaches, the method 700 may include additional and/or alternative operations, such as installing a multicast router flood entry in the IPMC table upon determining that at least one multicast router is connected to one or more ports on the switching processor; determining at least one destination based on the multicast router flood entry; and sending the at least one multicast packet to the at least one destination, in one approach.

In another approach, determining at least one destination based on the multicast router flood entry comprises determining the at least one destination based on the VLAN ID, in one embodiment. In another embodiment, determining at least one destination based on the multicast router flood entry comprises determining the at least one destination based on at least one destination address and at least one destination port as defined in the VLAN ID. In still another embodiment, determining at least one destination based on the multicast router flood entry may include performing a longest prefix match in the IPMC table. Additionally and/or alternatively, the at least one destination may be determined based at least in part on at least one IGMP report in another embodiment.

In still other approaches, the inventive systems and methods may be embodied as a computer program product. In one particular approach, the inventive concept may be embodied as computer program product for controlling multicast switching on a switching processor, the computer program product including computer readable program code such as computer readable program code configured for installing an MC table on a switching processor managing switching on at least one VLAN; computer readable program code configured for determining that multicast flooding is enabled or disabled in the switching processor; computer readable program code configured for installing a drop entry in the MC table upon determining that multicast flooding is disabled in the switching processor; computer readable program code configured for detecting whether one or more multicast routers is connected to one or more ports coupled to the switching processor; computer readable program code configured for installing a multicast router flood entry in the MC table when at least one multicast router is connected to one or more of the one or more ports on the switching processor; computer readable program code configured for receiving at least one multicast packet; computer readable program code configured for dropping the at least one multicast packet based on the drop entry when no multicast router is connected to any of the one or more ports coupled to the switching processor; computer readable program code configured for determining at least one destination based on the multicast router flood entry when at least one multicast router is connected to one or more of the one or more ports on the switching processor; and computer readable program code configured for sending the at least one multicast packet to the at least one destination.

Some of the advantages of using the methods and systems described herein include executing switching decisions without requiring that multicast data traffic be trapped continuously to a processor (which saves time and processing capacity), and without requiring separate entries for each multicast group receiving the data traffic on a given VLAN, which also simplifies switching logic, reduces processing time and resource usage, and thus reducing overall cost to the system. In a preferred embodiment, the multicast data traffic may be managed utilizing a single entry in hardware. Moreover, the single entry may advantageously be embodied as a single entry in an ASIC of a switching processor, in some approaches.

In many embodiments, the presently described methods and systems for managing multicast packets may be implemented in a network switch, such as an IBM TOR switches G8124 and/or G8124-E.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a switching processor;
logic configured for installing a Multicast Control (MC) table on a switching processor managing switching on a virtual local area network (VLAN);
logic configured for determining if multicast flooding is disabled in the switching processor;
logic configured for installing a drop entry in the MC table upon determining that multicast flooding is disabled in the switching processor;
logic configured for detecting whether one or more multicast routers is connected to one or more ports coupled to the switching processor;
logic configured for receiving at least one multicast packet; and
logic configured for dropping the at least one multicast packet based on the drop entry when no multicast router is connected to any of the one or more ports coupled to the switching processor.

2. The system as recited in claim 1, wherein the drop entry comprises a first group address and a first mask,
wherein the logic configured for dropping the at least one multicast packet comprises logic configured for sending the at least one multicast packet to the first group address when the at least one multicast packet belongs to a group corresponding to the first group address.

3. The system as recited in claim 1, further comprising:
logic configured for installing a multicast router flood entry in the MC table upon detecting that at least one multicast router is connected to one or more of the one or more ports coupled to the switching processor;
logic configured for determining at least one destination based on the multicast router flood entry; and
logic configured for sending the at least one multicast packet to the at least one destination.

4. The system as recited in claim 3, wherein the multicast router flood entry comprises:
a second group address;
a second mask; and
VLAN identification (VLAN ID),
wherein the logic configured for determining at least one destination based on the multicast router flood entry comprises logic configured for determining the at least one destination based on the VLAN ID.

5. The system as recited in claim 4, wherein the VLAN ID comprises at east one destination address and at least one destination port,
wherein the logic configured for determining at least one destination based on the multicast router flood entry comprises logic configured for determining the at least one destination based on the at least one destination address and the at least one destination port.

6. The system as recited in claim 5, wherein the at least one destination address is selected from the group consisting of a device address, a media access control (MAC) address, and an Internet protocol (IP) address.

7. The system as recited in claim 6, further comprising logic configured for determining the at least one destination based at least in part on at least one Internet Group Multicast Protocol (IGMP) report.

8. The system as recited in claim 7, wherein the drop entry comprises a first group address and a first mask,
wherein the logic configured for dropping the at least one multicast packet comprises logic configured for sending the at least one multicast packet to the first group address,
wherein the logic configured for determining at least one destination based on the multicast router flood entry comprises logic configured for performing a longest prefix match in the multicast router flood entry,
wherein the MC table is installed as a single entry in an application specific integrated circuit (ASIC) of the switching processor,
wherein the first mask is a 4-bit mask,
wherein the second mask is a 4-bit mask,
wherein the first group address is 224.0.0.0,
wherein the second group address comprises all addresses ranging from 224.0.0.0 to 239.255.255.255.

9. The system as recited in claim 3, wherein the logic configured for determining at least one destination based on the multicast router flood entry comprises logic configured for performing a longest prefix match in the MC table.

10. The system as recited in claim 3, wherein the MC table is installed as a single entry in an application specific integrated circuit (ASIC) of the switching processor.

11. A method, comprising;
installing a Multicast Control (MC) table on a switching processor, wherein the switching processor manages switching on at least one virtual local area network (VLAN);
determining that multicast flooding is enabled or disabled in the switching processor;
installing a drop entry in the MC table upon determining that multicast flooding is disabled in the switching processor;
detecting any multicast routers that are connected to one or more ports coupled to the switching processor;
receiving at least one multicast packet; and
dropping the at least one multicast packet based on the drop entry when no multicast router is connected to any of the one or more ports coupled to the switching processor.

12. The method as recited in claim 11, wherein the drop entry comprises a group address and a mask, and
wherein dropping the at least one multicast packet comprises sending the at least one multicast packet to the group address when the at least one multicast packet belongs to a group corresponding to the group address.

13. The method as recited in claim 11, further comprising:
installing a multicast router flood entry in the MC table upon determining that at least one multicast router is connected to at least one of the one or more ports coupled to the switching processor;
determining at least one destination based on the multicast router flood entry; and
sending the at least one multicast packet to the at least one destination.

14. The method as recited in claim 13, wherein the multicast router flood entry comprises:
a group address;
a mask; and
a VLAN identification (VLAN ID),
wherein the determining at least one destination based on the multicast router flood entry comprises determining the at least one destination based on the VLAN ID.

15. The method as recited in claim 14, the VLAN ID comprising at least one destination address and at least one destination port,
wherein the determining at least one destination based on the multicast router flood entry comprises determining the at least one destination based on the at least one destination address and the at least one destination port.

16. The method as recited in claim 15, wherein the destination address is selected from a group consisting of: a device address, a media access control (MAC) address; and an Internet protocol (IP) address.

17. The method as recited in claim 16, wherein the MC table is installed as a single entry in an application specific integrated circuit (ASIC) of the switching processor,
wherein the drop entry comprises a first group address and a first mask,
wherein the dropping the at least one multicast packet comprises sending the at least one multicast packet to the first group address,
wherein the determining at least one destination based on the multicast router flood entry comprises performing a longest prefix match in the multicast router flood entry,
wherein the at least one destination is determined based at least in part on at least one Internet Group Multicast Protocol (IGMP) report,
wherein the first mask is a 4-bit mask,
wherein the second mask is a 4-bit mask,
wherein the first group address is 224.0.0.0,
wherein the second group address comprises all addresses ranging from 224.0.0.0 to 239.255.255.255.

18. The method as recited in claim 13, wherein the determining at least one destination based on the multicast router flood entry comprises performing a longest prefix match in the MC table.

19. The method as recited in claim 13, wherein the at least one destination is determined based at least in part on at least one Internet Group Multicast Protocol (IGMP) report.

20. A computer program product for controlling multicast switching on a switching processor, the computer program product comprising a computer readable storage medium having embodied therewith computer readable program code, the computer readable program code comprising:
computer readable program code configured for installing an Multicast Control (MC) table on a switching processor managing switching on at least one virtual local area network (VLAN);
computer readable program code configured for determining that multicast flooding is enabled or disabled in the switching processor;
computer readable program code configured for installing a drop entry in the MC table upon determining that multicast flooding is disabled in the switching processor;
computer readable program code configured for detecting any multicast routers that are connected to one or more ports coupled to the switching processor;
computer readable program code configured for installing a multicast router flood entry in the MC table when at least one multicast router is connected to any of the one or more ports on the switching processor;
computer readable program code configured for receiving at least one multicast packet;

computer readable program code configured for dropping the at least one multicast packet based on the drop entry when no multicast router is connected to any of the one or more ports coupled to the switching processor;

computer readable program code configured for determining at least one destination based on the multicast router flood entry when at least one multicast router is connected any of the one or more ports on the switching processor; and computer readable program code configured for sending the at least one multicast packet to the at least one destination.

\* \* \* \* \*